United States Patent
Werthmann

(10) Patent No.: US 10,301,005 B2
(45) Date of Patent: May 28, 2019

(54) VEHICLE DOOR UNIT AND VEHICLE WITH DOOR UNIT

(71) Applicant: Airbus Operations GmbH, Hamburg (DE)

(72) Inventor: Vitalij Werthmann, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 125 days.

(21) Appl. No.: 15/370,775

(22) Filed: Dec. 6, 2016

(65) Prior Publication Data
US 2017/0158305 A1 Jun. 8, 2017

(30) Foreign Application Priority Data
Dec. 7, 2015 (DE) .......................... 10 2015 224 449

(51) Int. Cl.
| | | |
|---|---|---|
| *B64C 1/14* | (2006.01) | |
| *E05B 65/10* | (2006.01) | |
| *E05D 15/48* | (2006.01) | |
| *E05D 15/54* | (2006.01) | |
| *E05D 15/56* | (2006.01) | |

(Continued)

(52) U.S. Cl.
CPC .......... *B64C 1/143* (2013.01); *E05B 65/1033* (2013.01); *E05D 15/48* (2013.01); *E05D 15/54* (2013.01); *E05D 15/56* (2013.01); *E05F 1/1091* (2013.01); *E05F 15/63* (2015.01); *E05D 2015/485* (2013.01); *E05Y 2201/478* (2013.01);

(Continued)

(58) Field of Classification Search
CPC ................................. B64C 1/143; E05D 15/56
See application file for complete search history.

(56) References Cited

U.S. PATENT DOCUMENTS 3,051,280 A * 8/1962 Wood .................... B64C 1/1407
16/302
3,791,073 A * 2/1974 Baker .................. B64C 1/1407
244/129.5

(Continued)

FOREIGN PATENT DOCUMENTS

| DE | 258591 | 7/1988 |
|---|---|---|
| EP | 0876954 | 11/1998 |

(Continued)

OTHER PUBLICATIONS

Machine translation of FR3018064.*
German Search Report, dated Aug. 10, 2016, priority document.

*Primary Examiner* — Marcus Menezes
(74) *Attorney, Agent, or Firm* — Greer, Burns & Crain, Ltd.

(57) ABSTRACT

A vehicle door unit comprises a rotating lever supported rotatably about a first shaft at a first end, a door mounting coupled rotatably about a second shaft to a second end of the rotating lever, a door attached to the door mounting and being configured to cover an opening in a vehicle and to close off a vehicle interior, and a drive unit configured to rotate the rotating lever about the first shaft between a closed position and an open position. The rotating lever is configured to move the second shaft, on a movement from the closed position to the open position, on a circular path, due to which the door mounting is first moved into the vehicle interior and, on further rotation of the rotating lever, out of the vehicle interior.

16 Claims, 12 Drawing Sheets

(51) Int. Cl.
*E05F 1/10* (2006.01)
*E05F 15/63* (2015.01)

(52) U.S. Cl.
CPC ..... *E05Y 2800/11* (2013.01); *E05Y 2900/502* (2013.01)

(56) References Cited

U.S. PATENT DOCUMENTS

| | | | | | |
|---|---|---|---|---|---|
| 3,802,125 | A | * | 4/1974 | Baker | B64C 1/1438 49/215 |
| 4,125,235 | A | * | 11/1978 | Fitzgerald | B64C 1/143 244/129.5 |
| 4,854,010 | A | * | 8/1989 | Maraghe | B64C 1/1407 16/360 |
| 5,031,863 | A | * | 7/1991 | Noble | B64C 1/1407 244/129.5 |
| 5,931,415 | A | | 8/1999 | Lingard et al. | |
| 6,305,737 | B1 | * | 10/2001 | Corder | B60J 5/0479 296/146.11 |

FOREIGN PATENT DOCUMENTS

| | | | | | |
|---|---|---|---|---|---|
| FR | 2634426 | A1 | * | 1/1990 | B60J 5/0479 |
| FR | 3018064 | A1 | * | 9/2015 | B64C 1/143 |

* cited by examiner

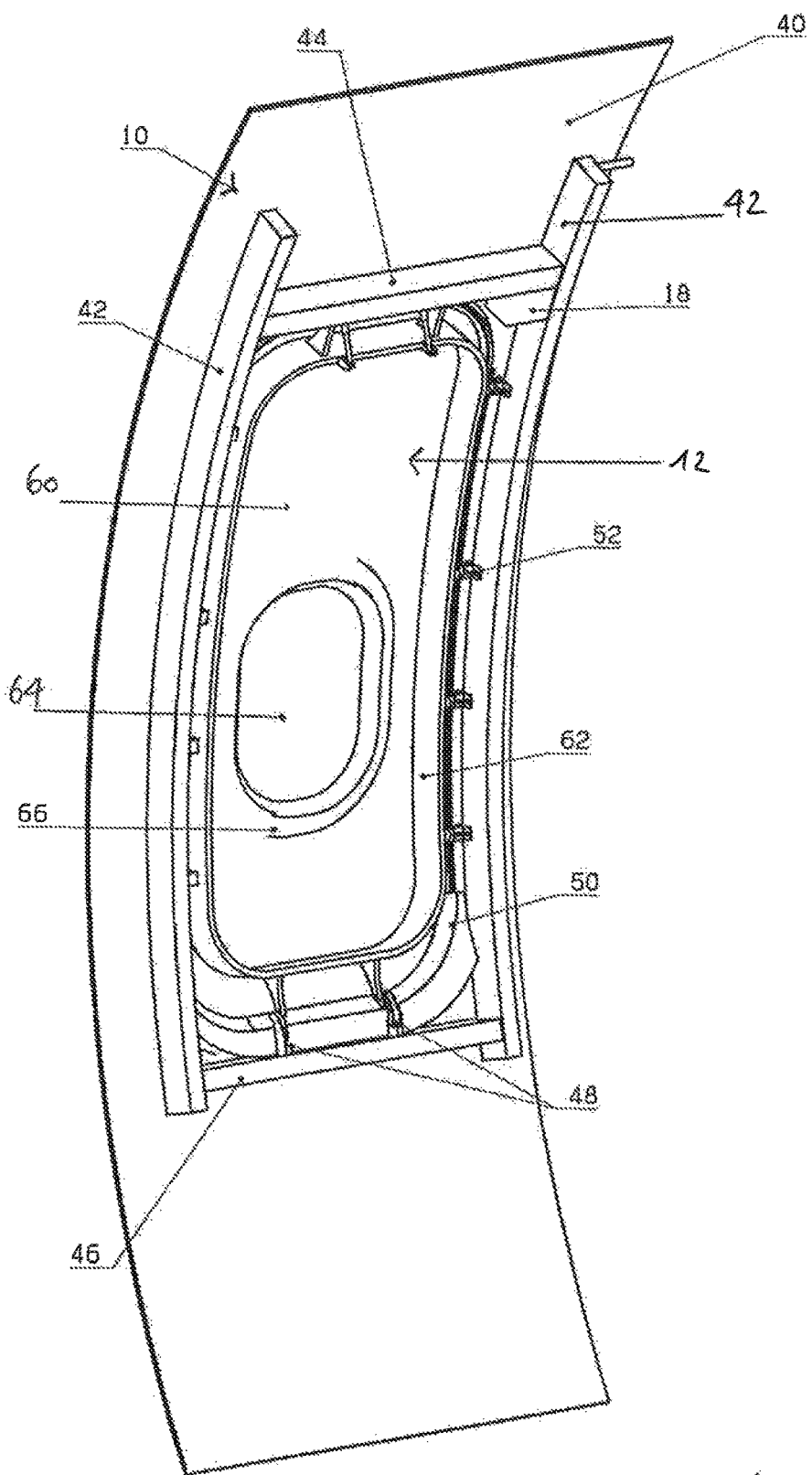

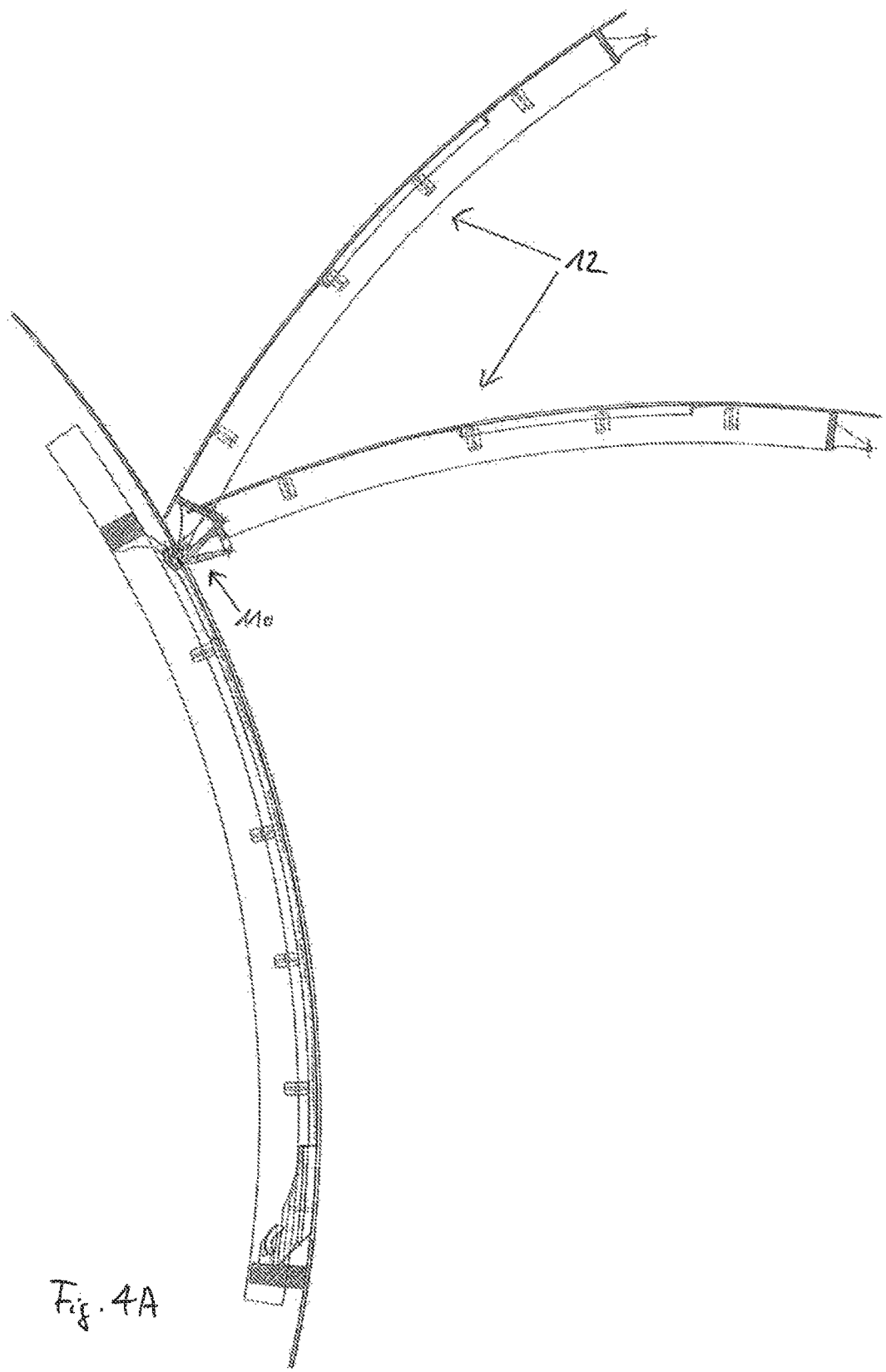

VEHICLE DOOR UNIT AND VEHICLE WITH DOOR UNIT

CROSS-REFERENCES TO RELATED APPLICATIONS

This application claims the benefit of the German patent application No. 10 2015 224 449.0 filed on Dec. 7, 2015, the entire disclosures of which are incorporated herein by way of reference.

BACKGROUND OF THE INVENTION

The invention relates to a vehicle door unit and a vehicle with such a door unit. In particular, the invention relates to a vehicle door unit for an emergency exit door of an aircraft, for example an emergency exit door arranged over a wing.

Vehicle doors serve the purpose of covering and closing an opening in a vehicle and of sealing off a vehicle interior with respect to the environment. For the secure closure of the vehicle door on a vehicle part surrounding the vehicle opening, various fittings and closure mechanisms, as well as door hinges, are used.

Moreover, on certain types of vehicles, safety standards must be observed. For example, it is necessary for aircraft doors that these close off the aircraft interior securely both on the ground and in flight mode. The door must also be securely closed while a pressure difference prevails between the aircraft interior and the aircraft environment. On the other hand, the doors must be able to be opened easily and quickly in an emergency. Emergency exit doors that are not envisaged for the normal boarding and disembarkation of people, but are only opened in an emergency, pose another special feature here. Such doors are opened, for example, by a flight attendant or a passenger in an emergency. In this case, a lever on the door must be pulled to open a closure mechanism. Then the door is manually separated completely from the aircraft fuselage, guided into the aircraft cabin, turned and conveyed outwards through the opening.

Such vehicle doors have the disadvantage that their opening process is awkward and takes a long time. In addition, they require space in the interior of the vehicle in order to turn the door and eject it through the opening created or to stow it in the interior of the vehicle.

SUMMARY OF THE INVENTION

An object of the invention is to provide a vehicle door which is easy and quick to open and obstructs the exit route as little as possible, or not at all.

A vehicle door unit comprises a rotating lever, a door mounting, a door and a drive unit which is configured to rotate the rotating lever. The rotating lever is supported rotatably about a first shaft at a first end. The rotating lever may be formed to be tubular, cube-shaped or plate-shaped. On a tubular or cube-shaped rotating lever, the first end lies at or close to an end face of the tube or cuboid. On a plate-shaped rotating lever, the first end lies at or close to a longitudinal side of the rotating lever, thus at its lateral end in a cross section view of the rotating lever.

The first shaft runs substantially parallel to an outer skin of the vehicle. In the case of a curved or bent outer skin of the vehicle, an idealized parallel is naturally to be assumed. In other words, the first shaft runs along one side of the vehicle opening which is closed by the door, and thus also along one side of the door. Here, the first shaft serves primarily as a pivot shaft for the rotating lever, but naturally also for the door attached to it. The first shaft preferably lies on the inside of the outer skin of the vehicle, due to which the aerodynamics of the vehicle are improved.

The door mounting is coupled rotatably about a second shaft to a second end of the rotating lever. The second end of the rotating lever lies, depending on the configuration of the rotating lever, at or close to an end face or longitudinal side of the rotating lever lying opposite the first end. The door mounting may assume any shape that permits it to rotate about the second shaft on the one hand and to be attached to the door on the other. The door mounting may thus be formed as an element projecting from the door, on which the rotatable coupling with the rotating lever is made at the end remote from the door. Naturally, the door mounting may also be produced in one piece with the door. The rotatable coupling may be formed by any hinge or hinge mechanism.

The door, which is attached to the door mounting, may be configured to cover an opening in the vehicle and to close off a vehicle interior. The door thus preferably has a shape that corresponds to the opening in the vehicle. A gap between the outside of the door and the outer skin of the vehicle may also be present. Tolerances in the door dimensions can be equalized by this and the free movement of the door guaranteed on opening and closing. In the closed state of the door, the outside of the door forms a continuous, aerodynamically optimized surface with the outer skin of the vehicle with the exception of a possible gap. A seal may naturally also be provided, which closes the gap, but is nevertheless elastic enough to guarantee a movement of the door on opening and closing.

The drive unit may be configured to rotate the rotating lever about the first shaft between a closed position and an open position. The closed position corresponds to a position of the rotating lever in which the door coupled to it by the door mounting closes the opening in the vehicle. By rotating the rotating lever about the first shaft, this moves to an open position in which the door mounting—and thus the door—are in an open position.

The rotating lever may further be configured to move the second shaft on a circular path in the event of a movement from the closed position to the open position, due to which the door mounting first moves into the vehicle interior and on further rotation of the rotating lever moves out of the vehicle interior. For example, the rotating lever may be a rigid rotating lever, so that the coupling point between rotating lever and door mounting, and thus the second shaft, rotates circularly about the first shaft.

Due to the special movement sequence (initially into the vehicle interior and then out of this) it is possible to release any door closures before the door is moved out of the opening in the vehicle. Furthermore, the radius that the second shaft determines with respect to the first shaft limits the amount by which the door mounting and thus also the door move into the vehicle interior. A simple opening of the door without significant impairment of the vehicle interior is possible due to this.

For example, a complete circle containing the circular path of the movement of the second shaft may be divided into two halves by a dividing line which is defined by a perpendicular from the first shaft to an outer skin of the vehicle. The perpendicular is the shortest connection between the first shaft and a plane formed by the outer skin of the vehicle. However, an outer skin of the vehicle does not necessarily have to be present at the point at which the perpendicular meets the plane of the outer skin of the vehicle. A part of the door that runs flush with the outer skin may also lie at this point, for example. Alternatively, the perpendicular may also meet a gap between the vehicle outer skin and the door. The dividing line is an extension of the perpendicular in both directions and intersects the circle twice (on both opposing sides of the first shaft), due to which this is divided into two halves.

In addition, the rotating lever may be configured to move the second shaft from a first half of the circle over the dividing line into the second half of the circle on the movement from the closed position to the open position. In other words, the coupling point between door mounting and rotating lever (thus the second shaft) is located in the first half of the circle in the closed position of the rotating lever. If the rotating lever now moves along the circular path, the second shaft moves towards the point of intersection of the dividing line with the circle, crosses the intersection point and moves further along the circular path on the second half of the circle. The intersection point is located on the side of the circle facing the vehicle interior. At the intersection point of the dividing line with the circle, the second shaft is thus at a maximal distance from the outer skin. Due to this, the second shaft and thus the door mounting move first into the vehicle interior and, after crossing the intersection point, out of the vehicle interior.

Furthermore, the dimensions of the rotating lever may be chosen such that at least a part of the second half of the circle lies outside the plane formed by the outer skin of the vehicle. In this case the second shaft and thus the door mounting can be led past the outer skin of the vehicle and project through the opening in the vehicle.

The rotating lever is thus configured to move the door attached to the door mounting into the vehicle interior in the movement on the first half of the circle and to move the door away from an edge of the vehicle opening in the movement on the first and second half of the circle. Up to the crossing of the intersection point, the door—at least the part of the door attached to the door mounting—is moved into the vehicle interior, as there the second shaft is located furthest in the vehicle interior on its circular path movement. The movement along the circular path also comprises a movement component parallel to the plane formed by the outer skin of the vehicle (thus perpendicular to the perpendicular described above). Since the second shaft and thus the door mounting move onto the intersection point described above along a circular path, the door also moves away from the outer skin of the vehicle according to the movement component parallel to the plane formed by the outer skin of the vehicle. On its movement in the second half of the circle, the second shaft continues to have this movement component until it has reached the middle of the second half of the circle—has thus moved a quarter of a circle away from the intersection point. Then the movement component is negative. This movement course is described, in particular, by the part of the door that is attached to the door mounting on account of the movement of the rotating lever.

In addition, the rotating lever may also be configured to move the second shaft, after passing through the second half of the circle, across the dividing line into the first half of the circle. In other words, the circular path may start in the first half of the circle (in the closed position) and end likewise in the first half of the circle (in the open position), wherein the second half of the circle is fully contained in the circular path.

Alternatively or in addition, the vehicle door unit may comprise a guide element and an engaging element. The guide element may have an open end and a closed end. For example, the guide element comprises two guide surfaces running parallel to one another, which at the closed end of the guide element run towards one another and/or merge. At the open end, the guide surfaces remain spaced apart. The engaging element may be in engagement with the guide element at least in the closed position of the rotating lever. In engagement with the guide element means that at least a part of the engaging element lies between the guide surfaces running parallel to one another. Furthermore, the guide element may be arranged so that in a closed position of the rotating lever and thus when the door is closed, the engaging element is in engagement with the guide element close to the open end.

The guide element may also be coupled to a frame element surrounding the opening of the vehicle. For example, the guide element is attached to the frame element. Alternatively, the guide element may also be formed in one piece with the frame element. The engaging element may be coupled to the door. In this case the engaging element is arranged at a point on the door that lies opposite to the guide element in a closed position of the door. Corresponding to the guide element, the engaging element may be attached to the door or formed in one piece with the door.

Alternatively, the engaging element may be coupled to the frame element surrounding the opening of the vehicle, for example attached to the frame element. The engaging element may also be formed in one piece with the frame element. The guide element may accordingly be coupled to the door, for example attached to the door. A one-piece formation of the guide element with the door is also possible. Here, too, engaging element and guide element lie opposite in a closed position of the door, so that the engaging element can engage in the guide element.

Furthermore, the guide element and the engaging element may be configured so that on rotation of the rotating lever by the drive unit, the engaging element is moved relative to the guide surfaces and along at least one of the two guide surfaces. In this movement, the engaging element is guided relative to the guide element first towards the closed end of the guide element and on further rotation moved back to the open end of the guide element. For example, the guide element and the engaging element are located at a point of the door or of the frame element surrounding the opening in the vehicle that is remote from the rotating lever. The relative movement between engaging element and guide element is thereby significantly influenced by the movement component of the rotating lever parallel to the plane of the outer skin of the vehicle.

In an advantageous configuration of the vehicle door unit, the rotating lever is arranged on an upper frame element of the vehicle opening and the door mounting on the upper side of the door, while the guide element and the engaging element are arranged on the lower frame element of the vehicle opening and/or on the underside of the door. Alternatively, the rotating lever and the door mounting may be arranged on a lateral frame element and/or a door side, while guide element and engaging element are arranged on an opposing side of the frame element and/or the door. As another alternative, the guide element and engaging element may be arranged not opposite the rotating lever, but may lie on an area of the vehicle opening and door to the side of the rotating lever.

The movement component of the rotating lever parallel to the plane of the outer skin of the vehicle has a direction that corresponds to a longitudinal or transverse direction of the door depending on the attachment of the rotating lever. The door is moved along its longitudinal or transverse direction by rotation of the rotating lever from the closed position to the open position. This movement leads to the relative movement between guide element and engaging element. Here a part of the door at the location of the guide element and engaging element can execute a movement that is determined by the rotary movement of the rotating lever and the shape of the guide element.

For example, the guide element may have a curved shape. The guide element may further be configured to guide the door into the vehicle interior on rotation of the rotating lever by the drive unit. In the case that the guide element is attached to the frame element, the guide element is curved towards the interior of the vehicle. In other words, at least the open end of the guide element lies further outside than a middle section of the curved guide element. The curvature may be uniform, but may alternatively also comprise different radii of curvature. In the case that the guide element is attached to the door, the guide element is curved away from the interior of the vehicle.

In an advantageous configuration of the guide element, this has a small radius of curvature at the open end, while the radius of curvature becomes larger towards the closed end. If the rotating lever now starts to rotate, the engaging element can be guided by the curvature of the guide element initially more strongly towards the interior of the vehicle. Due to this, the door can be guided inwards as quickly as possible from the outer skin of the vehicle. Due to a radius of curvature that is now larger or becoming larger towards the closed end of the guide element, on further rotation of the rotating lever the engaging element and the door are guided more strongly in a direction that lies parallel to the plane of the outer skin of the vehicle or the longitudinal/transverse direction of the door. As a whole, the door is thus moved out of the plane of the outer skin of the vehicle and guided inside behind the outer skin. A part of the door thus forms an undercut with the outer skin of the vehicle.

In addition or alternatively, the guide element may be configured and arranged so that the engaging element (almost) reaches the closed end when the rotating lever is in a position in which the second shaft is closest to the guide element. This position may be attained, for example, when the second shaft has reached the center of the second half of the circle described above. If the outer skin of the vehicle and the door between the rotating lever and the guide element are curved, the position of the rotating lever may lie at another point on the second half of the circle. By further rotation of the rotating lever, the second shaft moves away from the guide element again. The engaging element is thereby guided again along the guide element to its open end.

The guide element may be configured and arranged so that the engaging element exits the guide element through the open end during the rotation of the rotating lever. In other words, the engaging element reaches the open end before the rotating lever is located in the open position. Due to this, the engaging element can be moved out of the guide element, so that it is no longer in engagement with the guide element. This permits the door to move freely about the second shaft at the end of the movement of the rotating lever.

The engaging element may comprise one piece which has a section that is in engagement with the guide element. Alternatively, a sliding body may be attached to the engaging element, wherein the sliding body slides in the guide element and in particular between the guide surfaces. The sliding body may be in the form of a roll or rotatably supported cuboid, for example. In addition or alternatively, the sliding body or the section of the engaging element may be provided with a coating that improves sliding.

In addition or alternatively, the vehicle door unit may comprise at least a pair of retaining elements (also termed "doorstops"). A first retaining element (of the pair) may be attached to the frame element surrounding the opening of the vehicle, and a second retaining element (of the pair) may be attached to the door. In the closed position of the rotating lever and thus when the door is closed, the first and second retaining element may contact one another in an interacting manner In other words, the first and second retaining elements are attached to the frame element or to the door in such a way that when the door is closed they are arranged opposite one another. The first and second retaining elements may touch one another in order to contact one another in an interacting manner In this position the first and second retaining elements prevent a movement of the door from the vehicle interior to outside. The retaining element attached to the door can thus transfer a force acting from the vehicle interior to the retaining element attached to the frame element, so that the door is closed to the outside.

In addition, the rotating lever may be configured so that on rotation of the rotating lever from the closed position, a part of the door together with the retaining element attached to the part of the door is moved initially into the vehicle interior and the first and second retaining elements are separated from one another. By further rotation of the rotating lever, the retaining element attached to the part of the door can be moved in a curve around the retaining element attached to the frame element. These movements can be determined, in particular, by the movement of the second shaft on the circular path described above. While the second shaft moves from the closed position on the first half of the circle, the door mounting and the door are moved into the vehicle interior, so that also the first and second retaining element are separated from one another. During the movement of the second shaft on the second half of the circle, the door—at least the part to which the retaining element is attached—realizes a circular or curved movement. The retaining element attached to the door is guided around the retaining element attached to the frame element by this. The first and second retaining elements are advantageously dimensioned in such a way that the rotary movement of the rotating lever is sufficient to guide the retaining element attached to the door around the retaining element attached to the frame element. In addition or alternatively, the rotating lever may also be dimensioned in such a way that the retaining element attached to the door is guided around the retaining element attached to the frame element at a sufficient distance. The movement of the retaining element attached to the door can also be influenced by any mounted guide and engaging elements. Due to the interplay of rotating lever movement and the shape of the guide element, the part of the door to which the retaining element is attached can execute the curved movement(s) described above.

For example, the first retaining element may be formed T-shaped or L-shaped and the second retaining element may be formed T-shaped or L-shaped. In this case one limb of the first and second retaining element respectively may stand freely and the free-standing limbs of both retaining elements may lie parallel to one another in the closed position of the rotating lever. The free-standing limbs of the first and second retaining element advantageously lie parallel to a plane formed by the outer skin of the vehicle (and the door). Due to this they lie perpendicular to a force acting from the vehicle interior on the door, due to which this force can be transferred in the optimum manner from the retaining element attached to the door to the retaining element attached to the frame element. In the case of an aircraft door in particular, a pressure difference between the vehicle interior and the environment during flight operation can act uniformly on the door, so that a pressure force perpendicular to the plane formed by the outer skin of the vehicle (and the door) acts on the door. The two retaining elements that contact one another in an interacting manner are opposed to this pressure force.

The free-standing limbs of the retaining elements may also have smooth surfaces in each case that contact one another in an interacting manner These smooth contact surfaces of the retaining elements permit a floating bearing of the door. They are used to transfer a force from the door to the frame elements.

Alternatively, the surfaces of the retaining elements that contact one another in an interacting manner may respectively comprise suitable structures or shapes that prevent or at least make difficult sliding or slipping of the surfaces contacting one another in the closed position of the rotating lever—thus when the door is closed. These structures or shapes may be projections or indentations engaging in one another. These corresponding projections and indentations may also be arranged on parts of the retaining elements other than the free-standing limbs, which parts likewise touch or contact one another in the closed position.

In another configuration of the vehicle door unit, the vehicle door unit may comprise an actuator. The actuator may be coupled rotatably respectively to the rotating lever and to the door. Alternatively, the actuator may be coupled rotatably respectively to the rotating lever and to the door mounting. The actuator may also be configured to rotate the door about the second shaft opposite the rotating lever and move it away from the opening in the vehicle. In this case the actuator may be coupled rotatably to the rotating lever between the first and the second shaft.

The actuator may be configured to be shortened on the rotary movement of the rotating lever about the first shaft and a rotation of the door mounting (and of the door) about the second shaft. On account, in particular, of the movement component of the rotating lever in the direction of the plane formed by the outer skin of the vehicle (and the door), the coupling points of the actuator on the rotating lever and on the door or door mounting can approach one another, due to which the actuator is compressed.

In an advantageous configuration, the actuator comprises a spring, for example a gas pressure spring which is compressed upon a shortening of the actuator. When the aforesaid movement component of the rotating lever is reversed, the actuator can lengthen again, for example, the spring can extend again. The actuator can move the door and door mounting about the second shaft due to this. For example, the actuator can open the door still further shortly before and/or on reaching the open position of the rotating lever by a movement about the second shaft, thus move it even further away from the opening of the vehicle.

Alternatively or in addition, the actuator may comprise another element for lengthening the actuator. For example, the actuator may comprise a motor-driven spindle or a hydraulic piston which can lengthen the actuator and thereby open the door further.

In another configuration of the vehicle door unit, the rotating lever comprises two limbs arranged obliquely to one another. The rotating lever thus has a V-shape or U-shape. Moreover, the limbs may be curved, thus do not have to comprise straight elements. The limbs may be formed in one piece. Alternatively, they may also be individual elements fixedly connected to one another. The rotating lever may be configured so that in the open position the two limbs encompass a part of the vehicle outer skin and/or a part of a frame element surrounding the opening in the vehicle. The first shaft may lie at a free end of a first limb or in its vicinity and the second shaft may lie at a free end of a second limb or in its vicinity. In other words, the first shaft lies inside the vehicle outer skin and/or the frame element, and the second shaft is rotated during the rotary movement of the rotating lever about a vehicle outer skin edge and/or frame element edge forming the opening from the interior of the vehicle outwards. On reaching the open position, the vehicle outer skin edge and/or the frame element edge lies between the two limbs forming the rotating lever.

In an execution variant with actuator and limbs of the rotating lever arranged obliquely to one another, the actuator may be coupled rotatably to a limb of the rotating lever, at the free end of which the second shaft is located. Since this limb comes closer to the coupling point of the actuator with the door or door mounting during the rotary movement of the rotating lever, the actuator is compressed more strongly than would be the case in the event of a coupling with the other limb facing the first shaft.

Furthermore, the vehicle door unit may comprise one or more sealing elements. The one or more sealing elements may cover and/or close a gap between the door and the outer skin of the vehicle in the closed position of the rotating lever and closed door. In addition, profiles may be arranged on the frame elements surrounding the vehicle opening, to which the sealing elements are attached. The sealing elements may lie in this case on the inside of the door, so that the profiles and sealing elements separate the vehicle interior from the environment. The sealing elements are advantageously pressure-tight when they lie on the inside of the door. On aircraft in particular, the higher pressure in the aircraft interior in flight mode presses the sealing elements more strongly onto the inside of the door, so that the sealing properties are guaranteed in all operating phases.

The sealing elements may be formed to be elastically deformable. In particular, the sealing elements may be deformable in such a way that they permit the movement of the door into the vehicle interior during the rotary movement of the rotating lever. For example, the sealing elements are made from a rubber.

Finally, the drive unit of the vehicle door unit may comprise an electric or hydraulic motor which drives the rotating lever and rotates it about the first shaft. Alternatively or in addition, a gear unit or a force deflection (such as a cardan joint, for example) may be provided to facilitate the rotary movement of the rotating lever and the door. Alternatively or in addition, a manual drive may be provided, for example in the form of a crank handle or lever handle, by which the rotating lever can be rotated. This manual drive can be used, in particular, when the electric or hydraulic motor fails or cannot be supplied with energy.

According to another aspect, a vehicle is disclosed that comprises a vehicle door unit according to the variants and alternatives described above. The vehicle can be an aircraft, bus, truck, ship or similar.

BRIEF DESCRIPTION OF THE DRAWINGS

Preferred embodiments of the invention are now explained with reference to the enclosed schematic drawings, in which FIG. 1A shows a schematic representation of a vehicle door unit in perspective and as an interior view, FIGS. 4A-4B show a schematic sectional view and a detail of this in the open position of a rotating lever and various degrees of opening of a door of the vehicle door unit.

DETAILED DESCRIPTION OF THE PREFERRED EMBODIMENTS

Figure 1B:
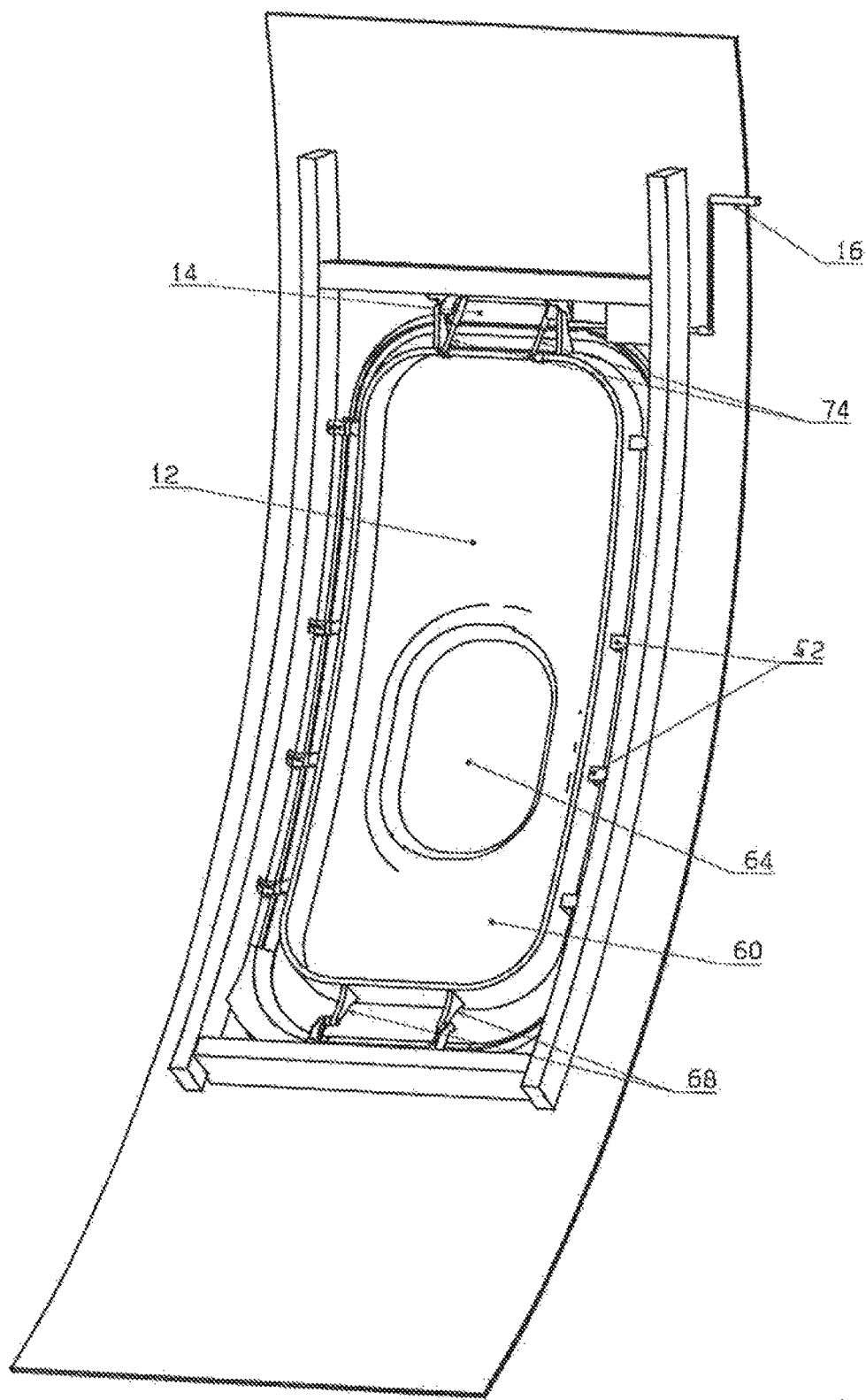
FIG. 1B shows a schematic representation of the vehicle door unit in perspective and as an interior view from another angle, FIGS. 2(a)-2(d) (collectively referred to as FIG. 2) show a schematic sectional view of a vehicle door unit and three enlarged details of this in a closed position of the vehicle door unit, FIGS. 3A(a)-3A(d), 3B, 3C(a)-3C(d), 3D and 3E (collectively referred to as FIGS. 3A-3E, or simply FIG. 3) show schematic sectional views of a vehicle door unit and enlarged details of this in various phases of an opening process of the vehicle door unit.

Elements, components and assemblies of a vehicle door unit are described below with reference to exemplary schematic representations in the figures. Here the figures show all elements, components and assemblies of the vehicle door unit in a certain configuration of the elements and components. However, the present invention is not restricted to the explicit representation in the figures. On the contrary, vehicle door units are also comprised that contain only one or a few of the elements, components and/or assemblies represented and described. The individual elements, components and assemblies can form further configurations of a vehicle door unit in any combination.

FIG. 1A shows a schematic representation of a vehicle door unit 10 in perspective and as an interior view. The representation of the vehicle door unit 10 is strongly simplified, in particular, the representation of the vehicle structure around the opening in the vehicle outer skin 40 and corresponding door 12. The vehicle structure comprises an outer skin 40 which has an opening. The opening is used, for example, for the boarding and alighting of passengers from the vehicle. It can also be an emergency opening for disembarking passengers in an emergency. On account of the opening in the outer skin 40, frame elements are provided which strengthen the outer skin around the opening. These frame elements include ribs 42 which are arranged laterally next to the opening. These ribs 42 or door ribs are arranged substantially perpendicular to a longitudinal axis of the vehicle. Furthermore, these ribs are generally described as frame elements or lateral frame elements 42. Alternatively or in addition, longitudinal members, so-called stringers, can also be arranged around the opening to reinforce the outer skin 40. These include the upper longitudinal member 44 and the lower longitudinal member 46. These members 44, 46 are also generally described as frame elements here.

The vehicle door unit 10 comprises a door 12 (or door assembly 12) which covers the opening in the vehicle and closes off a vehicle interior. The door 12 comprises a door outer side or door outer skin 60, and door stiffening elements which form a door stiffening frame 62. The door outer skin 60 is attached to the door stiffening frame 62 but can also be formed in one piece with this frame. The door can optionally also comprise a window opening 64 which is surrounded by a corresponding window stiffening or a window stiffening frame 66.

Retaining elements 52 are shown in FIG. 1A that comprise, respectively, a pair of retaining elements 52. A first retaining element is attached here to a frame element, for example a lateral frame element 42, while a second, corresponding retaining element is attached to the door 12, for example to the door stiffening frame 62. In a closed state of the door 12, the two corresponding retaining elements 52 contact one another in an interacting manner They thereby prevent a movement of the door 12 outwards from the vehicle interior.

Furthermore, the opening in the outer skin 40 of the vehicle can be provided circumferentially with a sealing element 50. In the closed state of the door 12, the inside of the door outer skin 60 can lie close to and/or be pressed onto this sealing element 50, for example a rubber seal.

FIG. 1B shows further details of the vehicle door unit 10. The vehicle door unit 10 thus comprises a rotating lever assembly. This comprises a rotating lever 14 which is supported rotatably about a first shaft at a first end. The vehicle door unit 10 further comprises a door mounting which is coupled rotatably about a second shaft to a second end of the rotating lever 14. The door 12 is attached to the door mounting. Alternatively, the door mounting can also be formed in one piece with the door 12.

A drive unit 18 of the vehicle door unit 10 can rotate the rotating lever 14 about the first shaft between a closed position and an open position. The drive unit can comprise an electric motor or hydraulic motor. The rotary movement of the rotating lever 14 can also be accomplished by a manual drive, such as a crank handle or lever handle 16, for example.

The vehicle door unit 10 further comprises one or more guide elements 48 and one or more corresponding engaging elements 68. In FIGS. 1A and 1B, two guide elements 48 are shown on a side of the door 12 lying opposite the rotating lever 14. It goes without saying that both the rotating lever 14 and the guide and engaging elements 48, 68 can be arranged at other positions on the frame elements and on the door. An arrangement of the rotating lever 14 at the upper or also the lower end of the door 12 is sensible only on account of the curvature of the outer skin 40 of the vehicle shown in the figures. In the case of a flat outer skin, the rotating lever 14 can also be arranged on one side, for example on the frame elements 42. Likewise, the guide and engaging elements 48, 68 can be arranged independently of the position of the rotating lever 14, for example laterally between the door stiffening frame 62 and the frame elements 42.

The door 12 is held all around by the retaining elements 52, the rotating lever assembly and the guide and engaging elements 48, 68. In the case of an aircraft, in particular, the excess pressure prevailing in the aircraft interior during flight mode can be transferred uniformly by the door 12 to the frame elements 42, 44, 46. Loads and forces that act on the door 12 from outside can naturally also be transferred by the aforesaid elements to the frame elements 42, 44, 46.

To move the door 12 from its closed position into an open position, and, in particular, to release the guide and engaging elements 48, 68 and the retaining elements 52 from one another, a certain movement of the door 12 is necessary. This movement is now explained with reference to FIGS. 2 and 3A to 3E. FIG. 2(a)-2(d) show a schematic sectional view of a vehicle door unit and three enlarged details of this sectional view in a closed position of the vehicle door unit 10. FIGS. 3A to 3E show schematic sectional views of the vehicle door unit 10 and enlarged details of this in various phases of an opening process of the vehicle door unit 10. For greater clarity, not all elements are provided with reference signs in the figures. However, FIGS. 2 and 3 show all the same elements and components, just in different positions.

Figure 2:
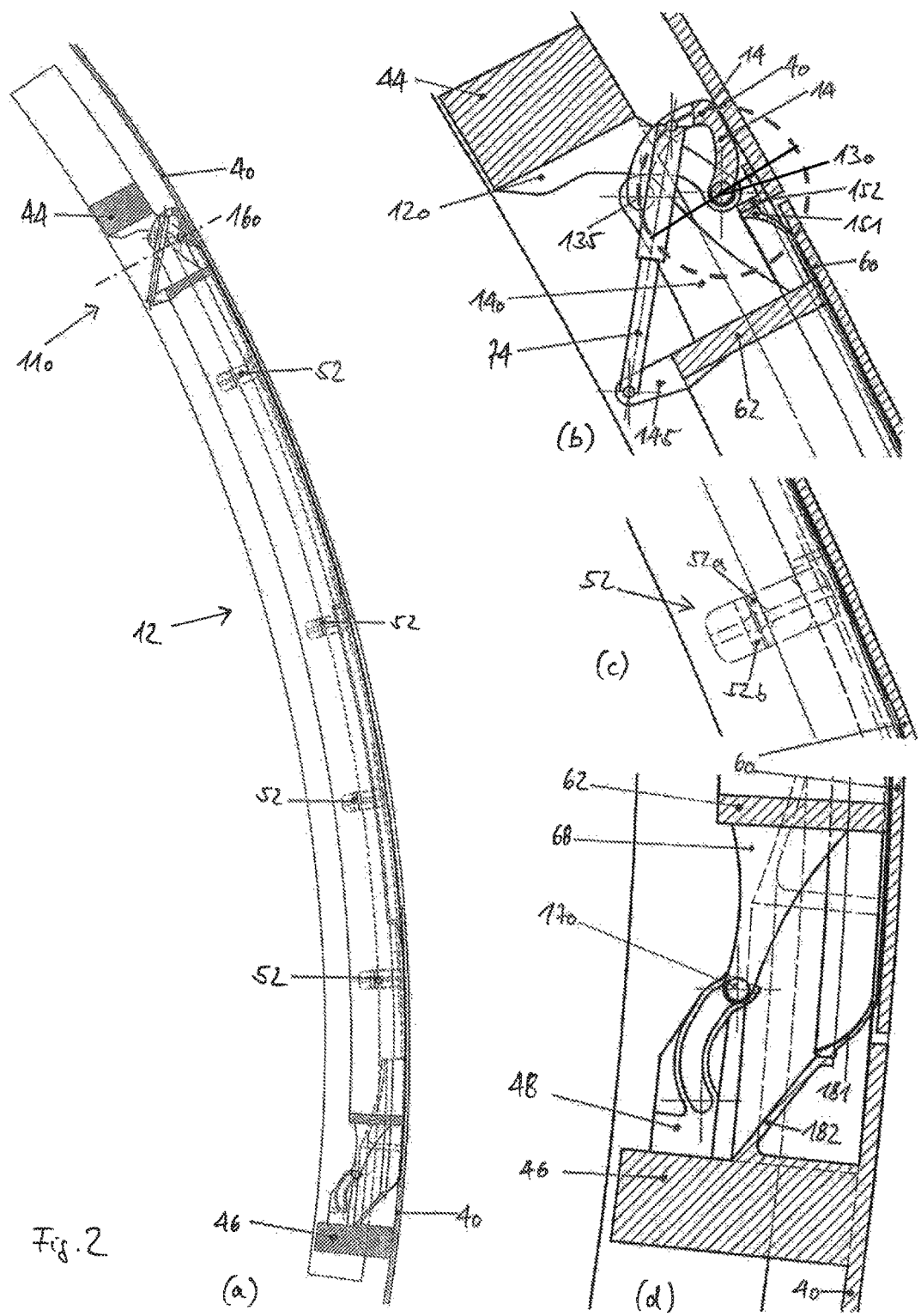

FIG. 2(*a*) shows a schematic sectional view through the entire vehicle door unit 10. The upper and lower frame element 44, 46 (longitudinal members) and the outer skin 40 of the vehicle attached to these frame elements are shown in this view. The door 12 is located lying in between. The door is attached to the upper frame element 44 via a rotating lever assembly 110. On its underside, the door 12 is coupled via guide and engaging elements 48, 68, at least in the closed state of the door 12 to the lower frame element 46. At its sides, the door 12 is held on the lateral frame elements 42 via retaining elements 52 shown by dashed lines.

Related to the sectional view in FIG. 2(*a*), FIG. 2(*b*) shows the rotating lever assembly 110 enlarged and in detail. A rotating lever retaining element 120 is attached to the upper frame element 44 or is formed in one piece with the upper frame element 44. The rotating lever 14 is coupled rotatably to the rotating lever retaining element 120 at one end of it. The rotating lever 14 is thereby supported rotatably about a first shaft 130 at a first of its ends (viewed in the cross section shown). The rotating lever 14 has a second end, to which a door mounting 140 is coupled rotatably about a second shaft 135. The door 12 is attached to a side of the door mounting 140 facing away from the second shaft 135. In particular, the door stiffening frame 62 is attached to the door mounting 140. Alternatively, the door mounting 140 can also be formed in one piece with the door 12 or the door stiffening frame 62.

The drive unit 18 shown in FIGS. 1A and 1B can rotate the rotating lever 14 about the first shaft 130. In FIGS. 2(*a*) and 2(*b*) the rotating lever 14 is shown in a closed position. The drive unit 18 can rotate the rotating lever 14 from the closed position into an open position about the first shaft 130. The rotating lever 14 is configured to move the second shaft 135 on a circular path upon movement from the closed position to the open position. Due to a rigid configuration of the rotating lever 14, in particular, each point of the rotating lever moves on a circular path about the first shaft 130, thus also the second shaft 135. Due to this movement on a circular path, the door mounting 140 moves first into the vehicle interior and, on further rotation of the rotating lever 14, out of the vehicle interior.

The vehicle door unit 10 further comprises an actuator 74 which is coupled rotatably to the rotating lever 14 and the door 12 respectively. In FIG. 2(*b*), the actuator 74 is connected rotatably to an additional frame element 145 which extends from the door stiffening frame 62 into the vehicle interior. Alternatively, the actuator 74 can also be connected rotatably to the door stiffening frame 62 or also the door mounting 140.

Finally, a seal 151 in the form of a sealing lip is provided. Alternatively, a tubular seal 151 can be used. The seal 151 serves to seal the vehicle interior off from the environment. The seal 151 is attached for this purpose to a seal holder or a seal profile 152 which is attached, in turn, to the outer skin 40. The seal 151 can naturally be attached to another element or another component or directly to the outer skin 40. In the closed state of the door 12, the door outer skin 60 lies at a free end of the seal 151. The vehicle interior is thus closed off or isolated from the environment of the vehicle on account of an elastic effect of the seal 151. In an aircraft, in particular, an excess pressure prevailing in the vehicle interior during flight mode can press the seal 151 onto the inside of the door outer skin 60, due to which the sealing property is improved.

FIG. 2(*c*) shows a pair of retaining elements 52 on an enlarged scale. A first retaining element 52*a* is attached to a frame element surrounding the opening of the vehicle, for example the lateral frame element 42. A second retaining element 52*b* is attached to the door 12, for example to the door stiffening frame 62. The first retaining element 52*a* can be formed T-shaped or L-shaped. The second retaining element 52*b* can likewise be formed T-shaped or L-shaped. The retaining elements 52 can also assume any other shape. What is common to both retaining elements 52*a*, 52*b* is that they comprise a component which stands out from the frame element 42, 44, 46 in the direction of the door 12, or stands out from the door 12 in the direction of the frame element 42, 44, 46. For example, the retaining elements 52*a*, 52*b* can contain a free-standing limb in each case which stands out in the manner described above. The free-standing limbs lie parallel to one another in the closed position of the rotating lever. The two limbs can thereby contact one another in an interacting manner and prevent the door 12 from moving outwards from the vehicle interior.

FIG. 2(*d*) shows the guide and engaging elements 48, 68 enlarged and in detail. These elements arranged on the lower area of the door 12 likewise serve to secure the door 12 during a closed position of the rotating lever 14, thus when the door 12 is closed. The guide element 48 is attached the frame element 46 for this. Alternatively, the guide element 48 can also be formed in one piece with the frame element 46. The engaging element 68 is also attached to the door 12. The engaging element 68 is advantageously attached to a lower part of the door stiffening frame 62. Alternatively, the engaging element 68 can also be formed in one piece with the door 12 or the door stiffening frame 62.

The engaging element 68 can comprise a sliding body 170. This can be in the form of a rod, roll or ball, for example. The sliding body 170 of the engaging element 68 is located, at least in the closed position of the rotating lever 14, in engagement with the guide element 48, as is shown in FIG. 2(*d*). The other components of the guide element 48 are explained with reference to FIGS. 3A to 3E.

In order to achieve an adequate retaining function of the door 12 in the closed position, even in the area of the guide element 48, the guide element 48 can also comprise a retaining component (not shown). For example, a retaining component in the form of a lug or similar can be arranged in the top right area of the open end of the guide element 48 shown in FIG. 2(*d*). The engaging element 68 (for example, the sliding body 170) can be supported thereby against this retaining component if a force directed outwards is applied to the door 12.

Alternatively to the representation shown in FIG. 2, the engaging element 68 and the guide element 48 can also be arranged reversed. In other words, the engaging element 68 can be attached to the lower frame element 46 or formed in one piece with this, and the guide element 48 can be attached to the door 12 or the door stiffening frame 62 or formed in one piece with either the door or the door stiffening frame.

Finally, a seal 181 is provided on this side of the door 12 also. Like the seal 151, the lower seal 181 also serves to seal off the vehicle interior from the environment. The seal 181 can be provided in the form of a sealing lip, for example. The seal 181 is also attached to a suitable seal profile 182 and lies close to a free end on the inside of the door outer skin 60 in the closed state of the door 12. The same embodiments and alternatives apply to the seal 181 as described for the seal 151 above.

Finally, a gap in the door 12 at its sides in relation to the outer skin 40 of the vehicle is also closed off by corresponding seals. These can be formed like the seals 151 and 181 or have a similar form and design.

In the present figures, the rotating lever 14 is shown V-shaped or U-shaped. The rotating lever 14 thus comprises two limbs arranged obliquely to one another. The limbs can be formed in a straight line to an intersection point at which the two limbs meet. Alternatively, one or both of the limbs can also be formed curved. The shape of the rotating lever 14 should not be understood as a restriction of the present disclosure. However, the form shown in the figures with curved limbs offers the advantage that the rotating lever 14 is very space-saving. Beveling of the limb facing the first shaft 130 enables the rotating lever 14 to be brought even closer to the inside of the outer skin 40 in the closed position.

To explain the movement of the rotating lever 14 and the second shaft 135 further, the following geometrical conditions are taken into account. In FIG. 2(*a*), a dividing line 160 is drawn in, which is defined by a perpendicular from the first shaft 130 and a plane formed through the outer skin 40. So as not to jeopardize a clear representation of the figures, the dividing line 160 is not shown in the detailed views of the figures. The perpendicular is a line that reflects the shortest distance from the first shaft 130 to the outer skin 40. The dividing line 160 defined by this divides a circle which contains the circular path of the second shaft 135, into two halves. In the embodiment according to FIG. 2, a first, upper and a second, lower half of the circle can be spoken of.

The rotating lever 14 is configured to move the second shaft 135 from a first half of this circle over the dividing line 160 into the second half of the circle on the movement from the closed position to the open position. This movement is explained in more detail with reference to FIGS. 3A to 3E.

Figure 3A:
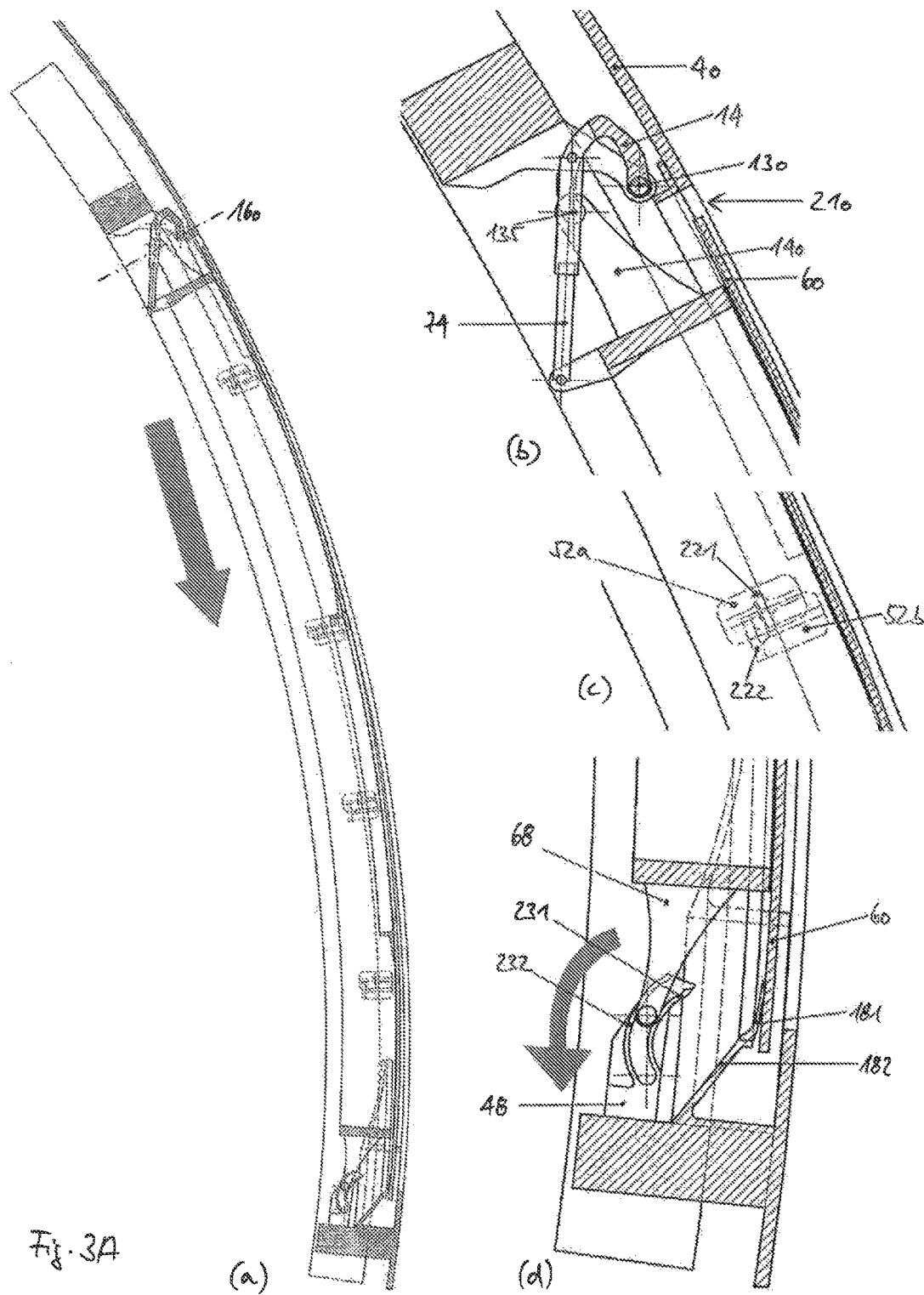

FIG. 3A shows a state of the vehicle door unit 10 on a rotary movement of the rotating lever 14 shortly after leaving the closed position. As can be clearly recognized in FIG. 3A(*b*), the rotating lever 14 was rotated about the first shaft 130. Here this rotation is counter-clockwise, as the door 12 in the figures is opened to the right. The second shaft 135 was moved on a circular path by the rotation of the rotating lever 14. The situation shown in FIG. 3A corresponds to a rotation in which the second shaft 135 was moved on a first half of the circle described above roughly as far as the dividing line 160. This movement contains a movement component parallel to the dividing line 160, due to which the second shaft 135 and thus also the door mounting 140 were moved into the vehicle interior. This is to be recognized in FIG. 3A(*b*), as the door outer skin 60 was moved out of the plane formed by the outer skin 40 of the vehicle in the direction of the vehicle interior. The circular movement of the second shaft 135 naturally also comprises a movement component parallel to the plane formed by the outer skin 40 (thus perpendicular to the dividing line 160). The door mounting 140 and thus the entire door 12 also move on account of this movement component away from the frame element 44 surrounding the opening (obliquely downwards in the figures). A gap 210 thereby arises between the outer skin 40 of the vehicle and the door outer skin 60.

The second retaining element 52*b*, which is attached to the door 12, also executes a corresponding movement. As can be recognized from FIG. 3A(*c*), a free-standing limb 222 of the second retaining element 52*b* has detached itself from a free-standing limb 221 of the first retaining element 52*a*, which is attached to a lateral frame element 42, in the direction of the vehicle interior.

The lower part of the door 12 is likewise moved by the rotary movement of the rotating lever 14. On account of the rotatable coupling of the door mounting 140 to the rotating lever 14, the movement of the door 12 in the lower area does not have to correspond 100 percent to the movement of the second shaft 135. Nevertheless, the engaging element 68 and the guide element 48 are provided to be able to open the door 12 without contacting or damaging other components and elements of the vehicle. In particular, the guide element 48 has an open end and a closed end. In FIG. 3A the open end lies at the top and the closed end at the bottom. For example, the guide element 48 comprises two guide surfaces 231, 232 which run parallel to one another and converge and merge at the closed end of the guide element 48. The guide surfaces 231, 232 end at the open end still spaced at a distance. In the event of a movement of the engaging element 68 or the guide element 48, the engaging element 68 moves along at least one of the two guide surfaces 231, 232. The sliding body 170 of the engaging element 68 is advantageously configured in such a way that it permits as smooth a movement as possible of the door 12.

Furthermore, the two guide surfaces 231, 232 can have a curved shape. Due to this, the door 12 is not only moved downwards by the rotary movement of the rotating lever 14, but also into the vehicle interior. The door outer skin 60 can press the seal 181 inwards in this process, for example. The seal 181 and the seal profile 182 are advantageously arranged in such a way that the door outer skin 60 can be moved into a region that lies between the outer skin 40 of the vehicle and the seal 181 and the seal profile 182.

On continuation of the rotation of the rotating lever 14, the second shaft 135 moves further on the circular path until it reaches its lowest point. "Lowest point" here means the point on the circular path that lies closest to the guide element 48 arranged opposite. Alternatively, a point on the circular path that determines the center of the second, lower half of the circle can also be meant by this. In other words, this is a point on the circular path that is determined by an intersection with a parallel of the plane formed by the outer skin 40, wherein the parallel runs through the first shaft 130 (the center point of the circle).

Figure 3B:
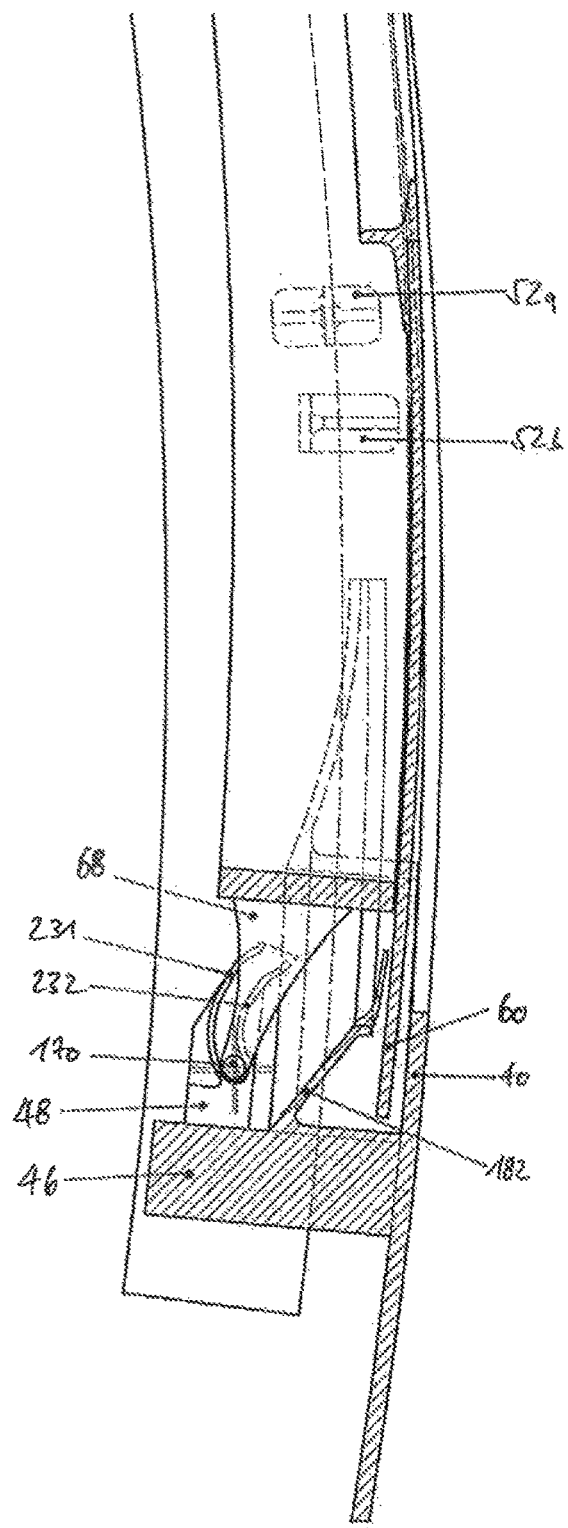

In this state the engaging element 68, for example the sliding body 170, also reaches the lower end of the guide element 48. This situation is illustrated in FIG. 3B. The guide element 48, and, in particular, the guide surfaces 231, 232, must therefore be coordinated to the circle radius of the circular movement of the second shaft 135. Before the time at which the second shaft 135 reaches the lowest point on the circular path (the nearest point to the guide element 48), the engaging element 68 must not yet have reached the closed end of the guide element 48. Further rotary movement of the rotating lever 14 would otherwise be blocked.

FIG. 3B further shows that at this time, the retaining element 52*b* attached to the door 12 was not only moved in the direction of the vehicle interior, but was also moved away from the retaining element 52*a* attached to the frame element 42, 44, 46. The door outer skin 60 is also located at a maximum overlap with the outer skin 40 of the vehicle. The space provided for this must offer sufficient room by appropriate dimensioning of the door outer skin 60, the outer skin 40, the lower frame element 46 and the seal profile 182.

Figure 3C:
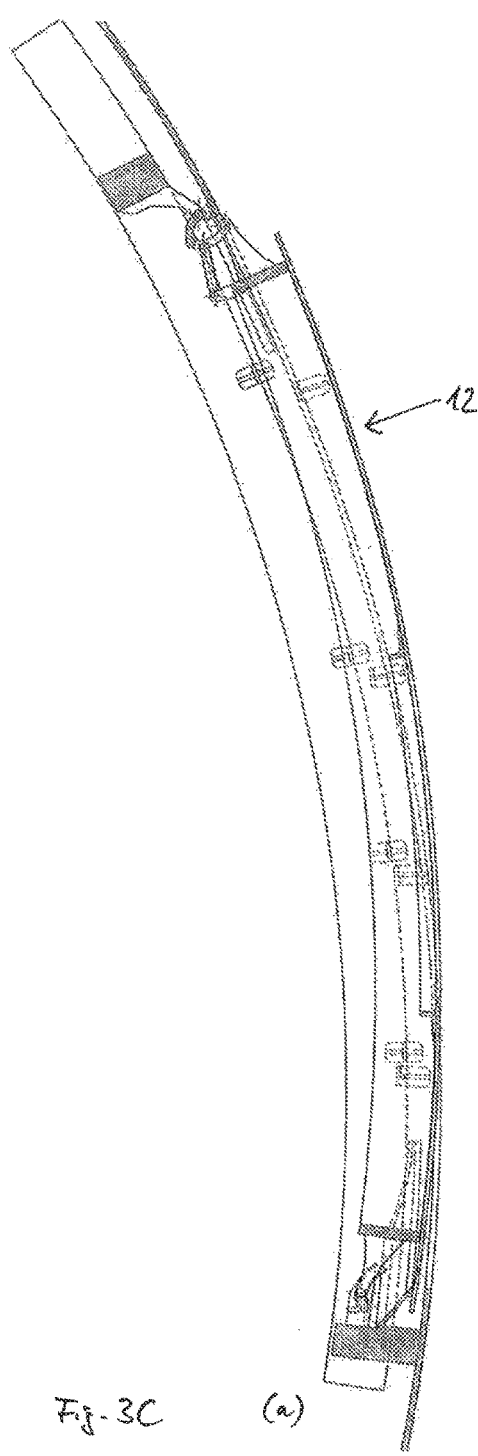
Figure 3C:
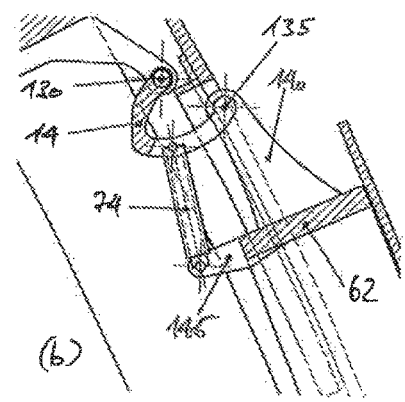
Figure 3C:
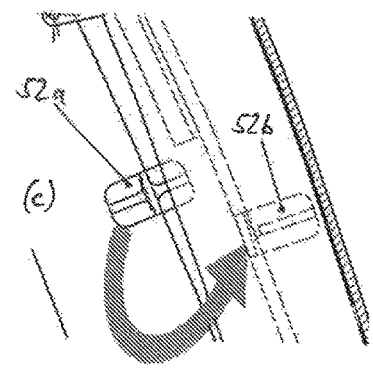
Figure 3C:
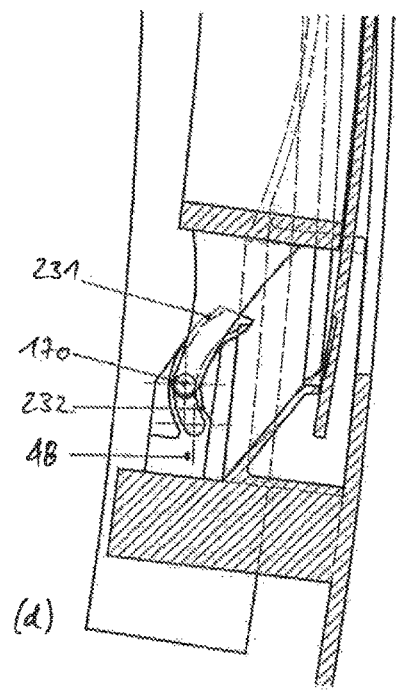

FIG. 3C now shows the vehicle door unit 10 at a time at which the rotating lever 14 was rotated further, wherein the second shaft 135 leaves the vehicle interior. In other words, the second shaft 135 is moved out over the plane formed by the outer skin 40. This is clearly recognizable in FIG. 3C(*b*).

Moreover, the actuator 74 was compressed on account of the movement. A spring element, such as a gas pressure spring, of the actuator 74 can be compressed. The maximum compression of the actuator 74 does not have to take place at the time or state of rotation as shown in FIG. 3C. On the contrary, it can also take place before or after this state. This can be achieved by suitable fitting of the actuator 74 to the rotating lever 14 and/or to the door 12 (for example, the door stiffening frame 62 or additional frame element 145).

Since the movement of the second shaft 135 along the second, lower half of the circle contains a movement component out of the vehicle, the second retaining element 52*b* also moves in a curve around the first retaining element 52*a* attached to the frame. This movement is shown in FIG. 3C(*c*) by a corresponding arrow.

The lower area of the door 12 is similarly moved upwards corresponding to the upward movement of the second shaft 135. Here the sliding body 170 again moves along the guide surfaces 231, 232 from the closed end to the open end of the guide element 48.

The door 12 is therefore located in an inclined position which is caused by the rotating lever 14 and the engaging and guide elements 48, 68. In this case the door 12 appears further out of the vehicle interior in the region of the rotating lever than on the opposite side.

Figure 3D:
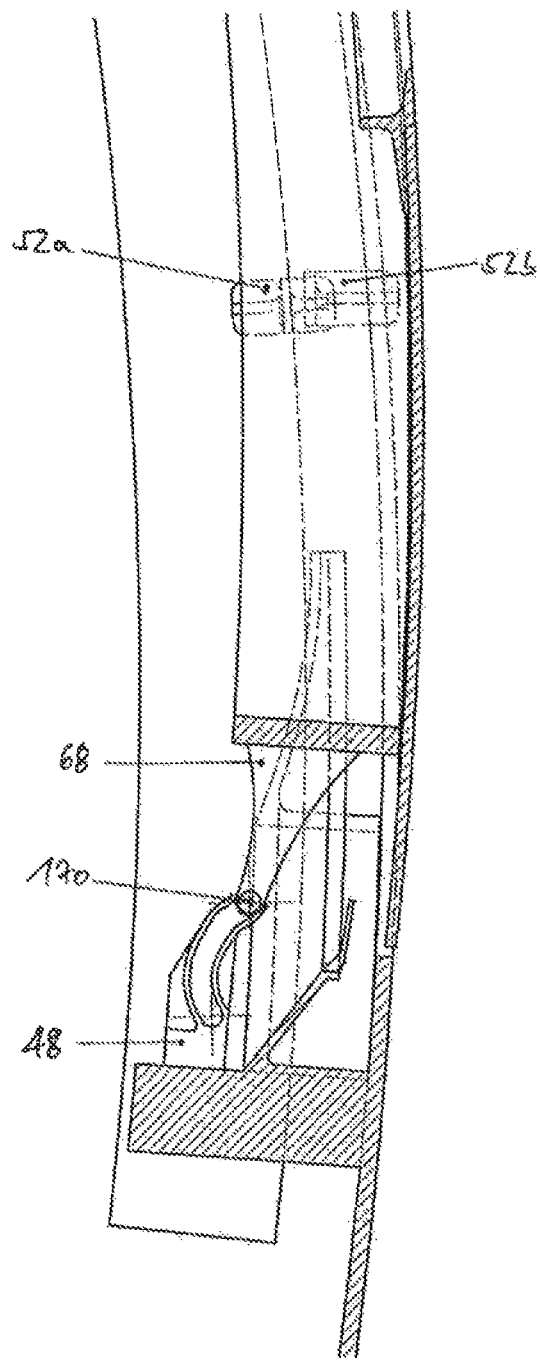

As is now shown in FIG. 3D, the movement of the lower area of the door 12 is continued until the engaging element 68 leaves the guide element 48 through the open end. This position of the door 12 in the lower area corresponds almost to the position of the door 12 in the closed state (closed position of the rotating lever 14). However, due to the inclined position of the door 12, areas of the door 12 that lie above the engaging element 68 are already outside the plane formed by the outer skin 40. The second retaining element 52*b* attached to the door 12 is now also no longer in engagement with the retaining element 52*a* attached to the frame element 42, 44, 46, but lies further outside.

Figure 3E:
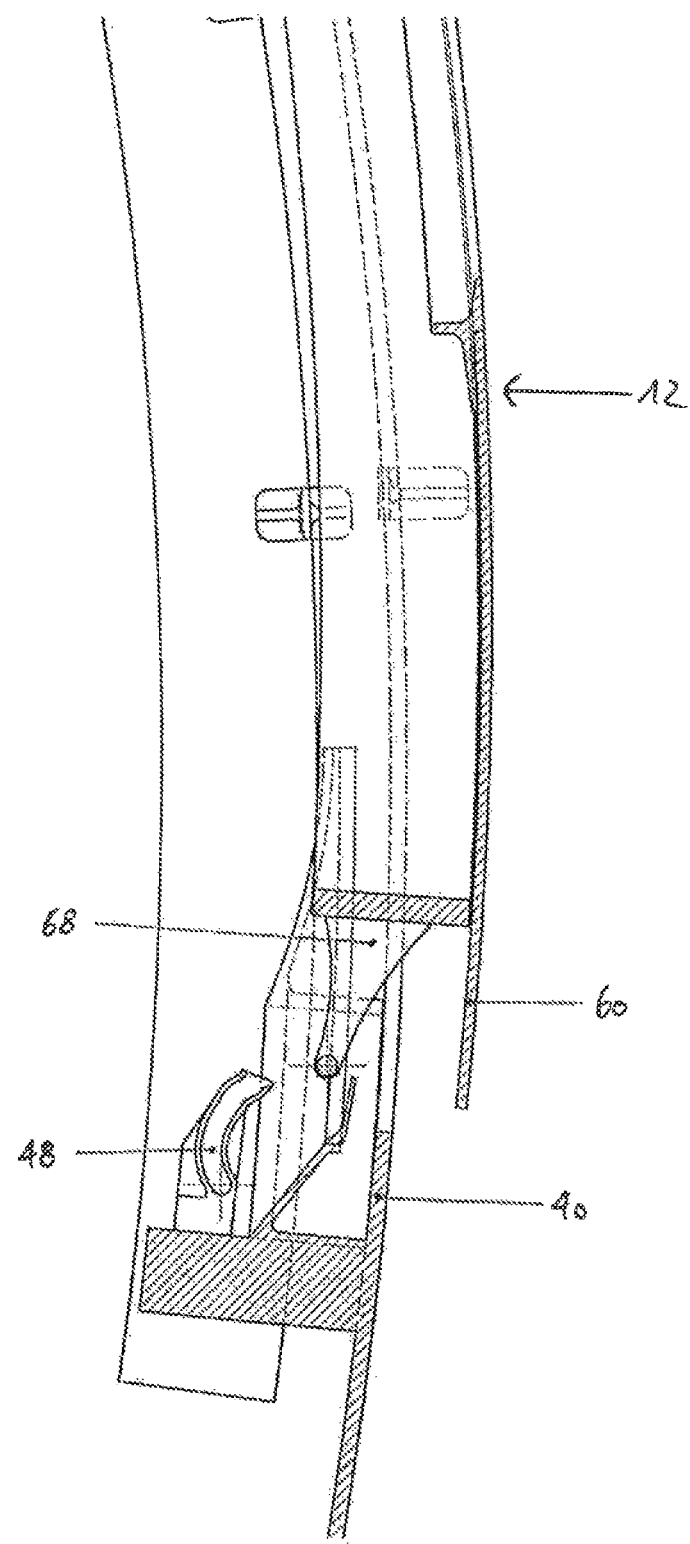

After leaving the open end of the guide element, as shown in FIG. 3E, the lower area of the door 12 can move freely. On account of the force applied by the actuator 74, the door 12 continues to move outwards from the vehicle interior. An end of the door 12 lying opposite the rotating lever 14 can also move away from the vehicle outer skin 40.

Figure 4B:
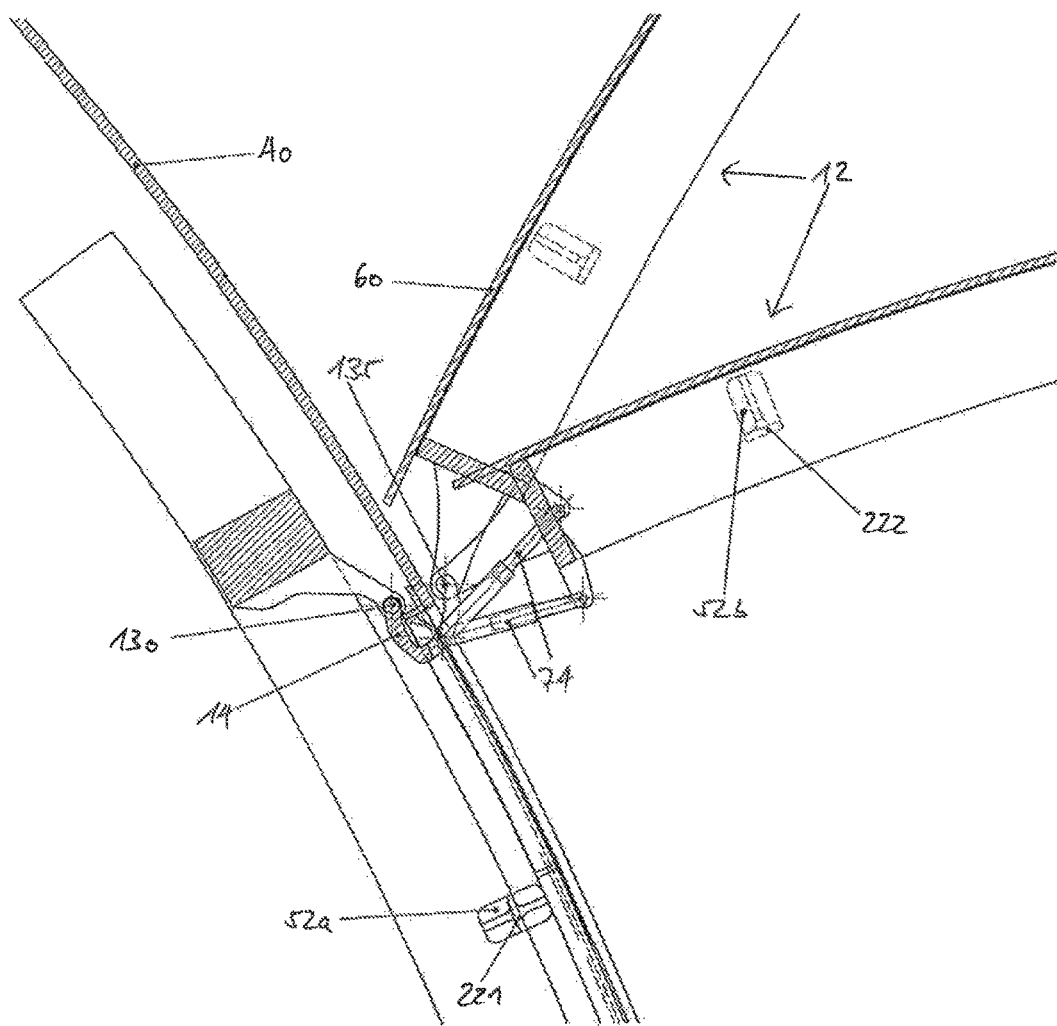

Finally, the rotating lever 14 reaches an open position as shown in FIGS. 4A and 4B. The illustration in FIGS. 4A and 4B shows the second shaft 135 roughly at the level of the dividing line 160 (which is not drawn in for reasons of clarity). The rotating lever 14 can naturally also be formed in such a way that, after moving through the second half of the circle, the second shaft 135 is moved over the dividing line 160 into the first, upper half of the circle.

It is clearly recognizable in FIG. 4B that the V-shaped or U-shaped rotating lever 14 reaches around the outer skin 40. This shape of the rotating lever 14 therefore offers the advantage of being arranged on the one hand compactly in the interior of the vehicle in the closed position, and on the other hand of being able to rotate the second shaft 135 as far as possible outwards and upwards. At the same time, the door outer skin 60 can come very close to the outer skin 40 of the vehicle during the closed position, due to which a gap between the two outer skins 40, 60 can be kept as small as possible.

Although the movement of the rotating lever 14 is completed, the door 12 can be opened further. This is accomplished by the actuator 74. As is evident in detail from FIG. 4B, the spring element of the actuator 74 can now expand again, due to which the door 12 is rotated about the second shaft 135. The actuator 74 can naturally also comprise an active element, for example an electric or hydraulic element, to accomplish the further movement of the door 12 about the shaft 135. However, the solution shown in FIGS. 2 to 4, in which the actuator is first compressed and can then expand again later, offers the advantage that the energy required for opening the door 12 can be introduced into the actuator 74 solely by the rotary movement of the rotating lever 14. The actuator can be realized more simply, lighter and more compactly due to this.

Figure 5:
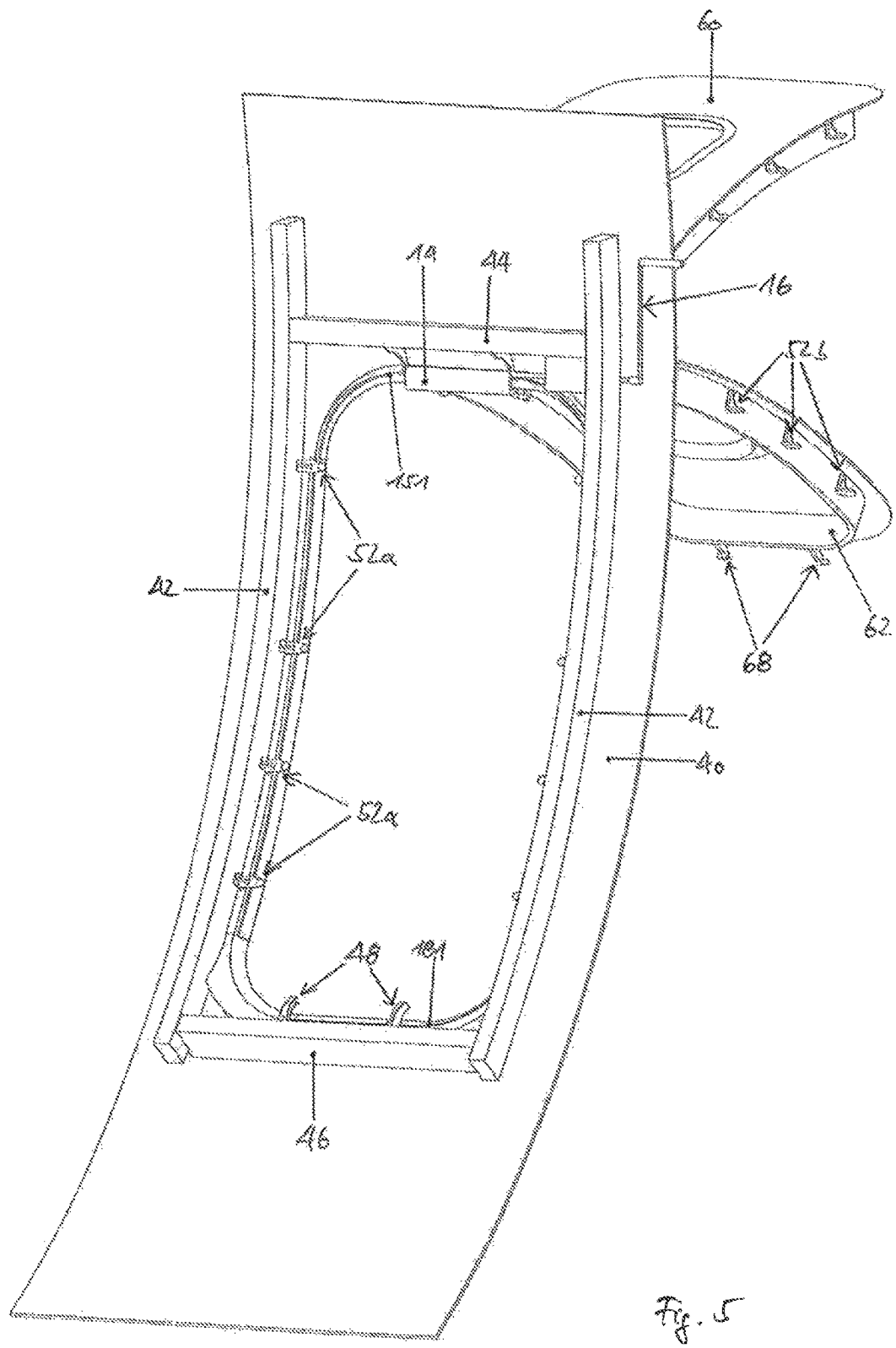
FIG. 5 shows a schematic representation of a vehicle door unit in perspective and as an interior view with various degrees of opening of a door of the vehicle door unit.

FIG. 5 shows another schematic representation of the open door in the states in FIGS. 4A and 4B as a view in perspective. It is clearly recognizable here that the retaining elements 52 and the engaging elements 68 and guide elements 48 are all separate from one another. The elements that remain on the frame elements 42, 44, 46 advantageously only occupy very little space. Moreover, they can be overlapped by the outer skin 40 of the vehicle. These elements thereby only obstruct disembarkation through the opening created in the outer skin 40 of the vehicle to a very small degree.

Alternatively to the arrangement shown in the figures of the guide element 48 on the lower frame element 46, the guide element 48 can also be fitted to the lateral frame elements 42. For example, guide element 48 can be arranged instead of the lowest retaining element 52*a*. The engaging elements 68 would be attached accordingly to the lateral door stiffening frame 62. The lower area of the door opening can be kept free from protruding elements by this, guaranteeing a safe disembarkation through the opening created.

Figure 6:
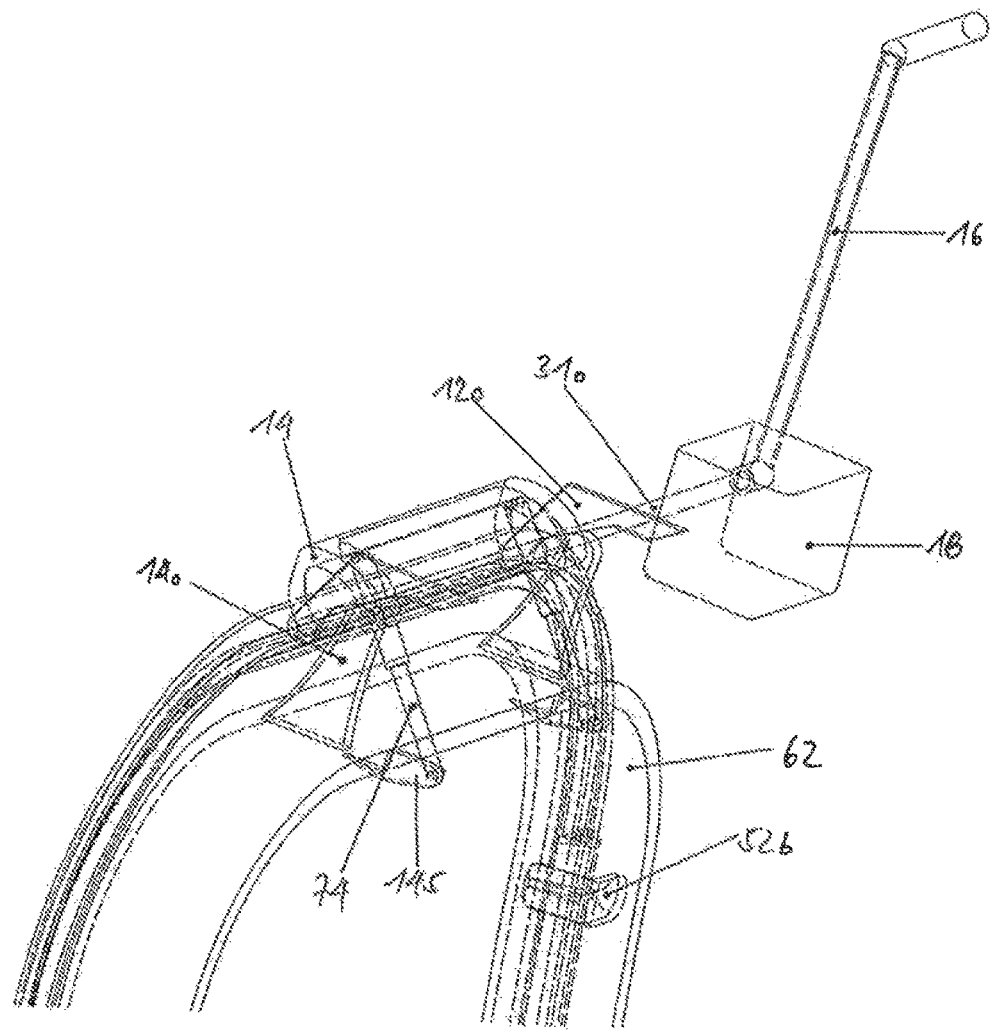
FIG. 6 shows a schematic representation of a detail of a vehicle door unit with drive unit.

FIG. 6 shows, finally, another detailed view of the upper door area with rotating lever 14 and drive unit 18. This highly simplified representation provides the drive unit 18 in such a way that a drive shaft 310 aligns directly with the first shaft 130. Transmissions or other devices, such as gearwheels, for example, can be avoided by this, due to which the weight and the space required can be reduced. This is advantageous in aircraft in particular. The drive unit 18 can be connected by a control rod (310), for example, to the rotating lever 14, wherein the rotating lever 14 is connected in a torsion-resistant manner to the control rod.

Alternatively, the rotating lever 14 can also be formed in one piece with a control rod which is coupled at its protruding end to the drive unit 18.

The rotating lever 14 is shown furthermore as an elongated element. This can be formed (bent) from a plate, for example. The rotating lever 14 is naturally not restricted to this configuration. For example, several rotating levers 14 can also be provided which are formed correspondingly from rods or cuboids. All rotating levers 14 can then be attached to one control rod adjacent to one another and at a distance from one another. However, the one-piece rotating lever 14 shown offers the advantage that it is more torsion-resistant.

Finally, FIG. 6 also shows a manual drive in the form of a crank handle or lever handle 16. This manual drive 16 can be provided in addition or alternatively to an electric or hydraulic motor 18. By actuating the manual drive 16 downwards from the top position shown, the rotating lever 14 can be rotated by one person in the vehicle interior about the first shaft 130 according to the preceding descriptions of FIGS. 2 to 4. The movement of the manual drive 16 can be limited to 180o or less on account of an inner lining of the vehicle. However, this is sufficient to move the second shaft 135 far enough over the circular path and out of the vehicle in order to execute the movements of the door 12 shown in FIGS. 2 to 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vehicle door unit comprising:
a rotating lever supported rotatably at a first end about a first shaft;
a door mounting coupled rotatably about a second shaft to a second end of the rotating lever;
a door fixedly and directly attached to the door mounting and being configured to cover an opening in a vehicle and to close off a vehicle interior; and
a drive unit configured to rotate the rotating lever between a closed position and an open position about the first shaft,
wherein the rotating lever is configured to move the second shaft on a circular path during a movement from the closed position to the open position,
wherein a complete circle containing the circular path of the movement of the second shaft is divided into two halves by a dividing line, the dividing line extends perpendicular to an outer skin of the vehicle and adjacent the first shaft and extends from the outer skin of the vehicle through the first shaft, and
wherein the rotating lever is configured to move the second shaft from a first half of the circle over the dividing line into the second half of the circle during the movement from the closed position to the open position upon rotation of the rotating lever in a first direction, due to which rotation of the rotating lever in the first direction the second shaft and the door mounting are moved initially into the vehicle interior and, on further rotation of the rotating lever in the first direction, are moved out of the vehicle interior.

2. The vehicle door unit according to claim 1, wherein the rotating lever is configured to move the door attached to the door mounting into the vehicle interior during the movement of the second shaft on the first half of the circle and to move the door away from an edge of the vehicle opening during the movement of the second shaft on the first and second half of the circle.

3. The vehicle door unit according to claim 1, wherein the rotating lever is further configured to move the second shaft, after passing through the second half of the circle, over the dividing line into the first half of the circle.

4. The vehicle door unit according to claim 1, further comprising:
a guide element, having an open end and a closed end; and
an engaging element in engagement with the guide element at least in the closed position of the rotating lever,
wherein the guide element is coupled to a frame element surrounding the opening in the vehicle and the engaging element is coupled to the door, and one of:
wherein the open end of the guide element lies in a direction of the rotating lever, or
wherein the engaging element is coupled to a frame element surrounding the opening in the vehicle and the guide element is coupled to the door, and wherein the closed end of the guide element lies in the direction of the rotating lever.

5. The vehicle door unit according to claim 4, wherein the guide element and the engaging element are configured in such a way that on rotation of the rotating lever by the drive unit, the engaging element is moved relative to the guide element initially towards the closed end and on further rotation is moved back to the open end of the guide element.

6. The vehicle door unit according to claim 4, wherein the guide element has a curved shape and is configured to guide the door into the vehicle interior on rotation of the rotating lever by the drive unit.

7. The vehicle door unit according to claim 4, wherein the guide element is configured and arranged in such a way that the engaging element leaves the guide element through the open end during the rotation of the rotating lever.

8. The vehicle door unit according to claim 1, further comprising:
a pair of retaining elements, of which a first retaining element is attached to a frame element surrounding the opening in the vehicle and a second retaining element is attached to the door,
wherein in the closed position of the rotating lever, the first and second retaining elements contact one another in an interacting manner and prevent a movement of the door outwards from the vehicle interior.

9. The vehicle door unit according to claim 8, wherein the rotating lever is configured in such a way that on rotation of the rotating lever from the closed position, a part of the door, together with the retaining element attached to the part of the door, is moved initially into the vehicle interior and the first and second retaining elements are separated from one another, and wherein the retaining element attached to the part of the door is moved by further rotation of the rotating lever in a curve around the retaining element attached to the frame element.

10. The vehicle door unit according to claim 8, wherein the first retaining element is T-shaped or L-shaped and the second retaining element is T-shaped or L-shaped, wherein a limb of each of the first and second retaining elements stands freely, and wherein the free-standing limbs of both retaining elements lie parallel to one another in the closed position of the rotating lever and contact one another in an interacting manner.

11. The vehicle door unit according to claim 1, further comprising:
an actuator coupled rotatably to the rotating lever and the door respectively,
wherein the actuator is configured to rotate the door about the second shaft relative to the rotating lever and move the door away from the opening in the vehicle.

12. The vehicle door unit according to claim 1, wherein the rotating lever comprises two limbs arranged obliquely to one another.

13. The vehicle door unit according to claim 12, wherein the rotating lever is configured in such a way that, in the open position, the two limbs encompass at least one of a part of a vehicle outer skin and a part of a frame element surrounding the opening in the vehicle.

14. The vehicle door unit according to claim 1, wherein the rotating lever is configured to move the second shaft from the first half of the circle into the second half of the complete circle over the dividing line, wherein the dividing line intersects the circle on a side of the circle facing the vehicle interior.

15. A vehicle comprising a vehicle door unit comprising:
a rotating lever supported rotatably at a first end about a first shaft;
a door mounting coupled rotatably about a second shaft to a second end of the rotating lever;
a door fixedly and directly attached to the door mounting and being configured to cover an opening in a vehicle and to close off a vehicle interior; and
a drive unit configured to rotate the rotating lever between a closed position and an open position about the first shaft,
wherein the rotating lever is configured to move the second shaft on a circular path during a movement from the closed position to the open position,
wherein a complete circle containing the circular path of the movement of the second shaft is divided into two halves by a dividing line, the dividing line extends perpendicular to an outer skin of the vehicle and adjacent the first shaft and extends from the outer skin of the vehicle through the first shaft, and
wherein the rotating lever is configured to move the second shaft from a first half of the circle over the dividing line into the second half of the circle during the movement from the closed position to the open position upon rotation of the rotating lever in a first direction, due to which rotation of the rotating lever in the first direction the second shaft and the door mounting are moved initially into the vehicle interior and, on further rotation of the rotating lever in the first direction, are moved out of the vehicle interior.

16. The vehicle according to claim 15, wherein the rotating lever is configured to move the second shaft from the first half of the circle into the second half of the circle over the dividing line, wherein the dividing line intersects the circle on a side of the circle facing the vehicle interior.

* * * * *